(12) United States Patent
Tyler et al.

(10) Patent No.: US 11,476,551 B2
(45) Date of Patent: Oct. 18, 2022

(54) CURRENT INTERRUPT DEVICES USING SHAPE MEMORY MATERIALS

(71) Applicant: 24M Technologies, Inc., Cambridge, MA (US)

(72) Inventors: Matthew Russell Tyler, New York, NY (US); Ryan Michael Lawrence, Providence, RI (US)

(73) Assignee: 24M Technologies, Inc., Cambridge, MA (US)

( * ) Notice: Subject to any disclaimer, the term of this patent is extended or adjusted under 35 U.S.C. 154(b) by 343 days.

(21) Appl. No.: 16/048,765

(22) Filed: Jul. 30, 2018

(65) Prior Publication Data

US 2019/0036101 A1    Jan. 31, 2019

Related U.S. Application Data

(60) Provisional application No. 62/539,156, filed on Jul. 31, 2017.

(51) Int. Cl.
*H01M 10/00* (2006.01)
*H01M 50/581* (2021.01)
*H01M 50/502* (2021.01)

(52) U.S. Cl.
CPC ....... *H01M 50/581* (2021.01); *H01M 50/502* (2021.01); *H01M 2200/10* (2013.01)

(58) Field of Classification Search
CPC .. H01M 2/348; H01M 2/202; H01M 2200/10; H01M 50/502; H01M 50/581; Y02E 60/10
See application file for complete search history.

(56) References Cited

U.S. PATENT DOCUMENTS 3,023,259 A   2/1962  Coler et al.
3,148,322 A   9/1964  Booe et al.
            (Continued)

FOREIGN PATENT DOCUMENTS

CN   1218578 A   6/1999
CN   1268254 A   9/2000
            (Continued)

OTHER PUBLICATIONS

Partial Supplementary European Search Report for European Application No. 18748587.5, dated Nov. 6, 2020, 11 pages.
            (Continued)

*Primary Examiner* — Nicholas P D'Aniello
(74) *Attorney, Agent, or Firm* — Cooley LLP

(57) ABSTRACT

Embodiments described herein relate to current interrupt devices (CIDs) for electrochemical cells that use a thermal trigger (e.g., shape memory and/or bi-metallic materials) to open an electrical circuit just prior to a thermal runaway or during short-circuit event to prevent catastrophic failure of the electrochemical cell. Embodiments include CIDs comprising a housing, a bus bar coupled to the housing, and a thermal trigger operably coupled to the bus bar. In some embodiments, the bus bar can include an engineered fracture site. In some embodiments, the thermal trigger is dimensioned and configured to deform at a predetermined temperature to break the bus bar at the engineered fracture site. In some embodiments, a portion of the bus bar travels about a hinge, opening the electrical circuit and preventing overcharging, thermal runaway, and/or other catastrophic failure events.

20 Claims, 3 Drawing Sheets

(56) References Cited

U.S. PATENT DOCUMENTS

| | | | |
|---|---|---|---|
| 3,715,697 A | 2/1973 | Them | |
| 3,918,995 A | 11/1975 | Palmer et al. | |
| 4,992,339 A * | 2/1991 | Georgopoulos | H01M 50/572 |
| | | | 429/7 |
| 5,776,627 A | 7/1998 | Mao et al. | |
| 5,879,832 A | 3/1999 | Vu et al. | |
| 5,998,051 A | 12/1999 | Poirier et al. | |
| 6,168,880 B1 | 1/2001 | Snyder et al. | |
| 6,204,635 B1 * | 3/2001 | Sullivan | H01M 2/1235 |
| | | | 320/134 |
| 6,544,679 B1 | 4/2003 | Petillo et al. | |
| 6,562,517 B1 | 5/2003 | Misra et al. | |
| 7,952,330 B2 * | 5/2011 | Mori | H02J 7/00306 |
| | | | 320/150 |
| 8,722,226 B2 | 5/2014 | Chiang et al. | |
| 8,722,227 B2 | 5/2014 | Chiang et al. | |
| 8,749,341 B2 | 6/2014 | Takeda et al. | |
| 8,778,552 B2 | 7/2014 | Chiang et al. | |
| 8,993,159 B2 | 3/2015 | Chiang et al. | |
| 9,153,833 B2 | 10/2015 | Chiang et al. | |
| 9,178,200 B2 | 11/2015 | Bazzarella et al. | |
| 9,184,464 B2 | 11/2015 | Chiang et al. | |
| 9,203,092 B2 | 12/2015 | Slocum et al. | |
| 9,293,781 B2 | 3/2016 | Chiang et al. | |
| 9,362,583 B2 | 6/2016 | Chiang et al. | |
| 9,385,392 B2 | 7/2016 | Chiang et al. | |
| 9,401,501 B2 | 7/2016 | Bazzarella et al. | |
| 9,437,864 B2 | 9/2016 | Tan et al. | |
| 9,484,569 B2 | 11/2016 | Doherty et al. | |
| 9,583,780 B2 | 2/2017 | Chiang et al. | |
| 9,614,231 B2 | 4/2017 | Carter et al. | |
| 9,786,944 B2 | 10/2017 | Chiang et al. | |
| 9,812,674 B2 | 11/2017 | Bazzarella et al. | |
| 9,825,280 B2 | 11/2017 | Chiang et al. | |
| 9,831,518 B2 | 11/2017 | Chiang et al. | |
| 9,831,519 B2 | 11/2017 | Chiang et al. | |
| 9,831,522 B2 | 11/2017 | Tan et al. | |
| 10,115,970 B2 | 10/2018 | Ota et al. | |
| 10,122,044 B2 | 11/2018 | Tan et al. | |
| 10,153,651 B2 | 12/2018 | Taylor et al. | |
| 10,181,587 B2 | 1/2019 | Ota et al. | |
| 10,230,128 B2 | 3/2019 | Chiang et al. | |
| 10,236,518 B2 | 3/2019 | Chiang et al. | |
| 10,236,537 B2 | 3/2019 | Hamaguchi et al. | |
| 10,411,310 B2 | 9/2019 | Chiang et al. | |
| 10,483,582 B2 | 11/2019 | Chiang et al. | |
| 10,497,935 B2 | 12/2019 | Ota et al. | |
| 10,522,870 B2 | 12/2019 | Tan et al. | |
| 10,566,581 B2 | 2/2020 | Bazzarella et al. | |
| 10,566,603 B2 | 2/2020 | Slocum et al. | |
| 10,593,952 B2 | 3/2020 | Ota et al. | |
| 10,601,239 B2 | 3/2020 | Taylor et al. | |
| 10,637,038 B2 | 4/2020 | Zagars et al. | |
| 10,665,836 B2 | 5/2020 | Cho et al. | |
| 10,777,852 B2 | 9/2020 | Woodford et al. | |
| 10,854,869 B2 | 12/2020 | Bazzarella et al. | |
| 2001/0038938 A1 | 11/2001 | Takahashi et al. | |
| 2004/0028995 A1 | 2/2004 | Shelekhin et al. | |
| 2004/0081890 A1 | 4/2004 | Xing et al. | |
| 2008/0254355 A1 | 10/2008 | Muraoka et al. | |
| 2009/0286139 A1 | 11/2009 | Awano | |
| 2009/0315666 A1 | 12/2009 | Ueda et al. | |
| 2010/0021821 A1 | 1/2010 | Kim et al. | |
| 2010/0047671 A1 | 2/2010 | Chiang et al. | |
| 2010/0255351 A1 | 10/2010 | Ijaz et al. | |
| 2010/0323264 A1 | 12/2010 | Chiang et al. | |
| 2011/0189520 A1 | 8/2011 | Carter et al. | |
| 2011/0200848 A1 | 8/2011 | Chiang et al. | |
| 2011/0274948 A1 | 11/2011 | Duduta et al. | |
| 2012/0121936 A1 | 5/2012 | Baek et al. | |
| 2012/0164499 A1 | 6/2012 | Chiang et al. | |
| 2013/0055559 A1 | 3/2013 | Slocum et al. | |
| 2013/0065122 A1 | 3/2013 | Chiang et al. | |
| 2013/0309547 A1 | 11/2013 | Bazzarella et al. | |
| 2013/0337319 A1 | 12/2013 | Doherty et al. | |
| 2014/0004437 A1 | 1/2014 | Slocum et al. | |
| 2014/0011060 A1 | 1/2014 | Yang et al. | |
| 2014/0030623 A1 | 1/2014 | Chiang et al. | |
| 2014/0039710 A1 | 2/2014 | Carter et al. | |
| 2014/0154546 A1 | 6/2014 | Carter et al. | |
| 2014/0170450 A1 | 6/2014 | Takahashi et al. | |
| 2014/0170524 A1 | 6/2014 | Chiang et al. | |
| 2014/0248521 A1 | 9/2014 | Chiang et al. | |
| 2014/0315097 A1 | 10/2014 | Tan et al. | |
| 2015/0024279 A1 | 1/2015 | Tan et al. | |
| 2015/0129081 A1 | 5/2015 | Chiang et al. | |
| 2015/0140371 A1 | 5/2015 | Slocum et al. | |
| 2015/0140410 A1 | 5/2015 | Kim et al. | |
| 2015/0171406 A1 | 6/2015 | Bazzarella et al. | |
| 2015/0180033 A1 | 6/2015 | Oyama et al. | |
| 2015/0280185 A1 | 10/2015 | Lampe-Onnerud et al. | |
| 2015/0280202 A1 | 10/2015 | Lee et al. | |
| 2015/0280267 A1 | 10/2015 | Chiang et al. | |
| 2015/0295272 A1 | 10/2015 | Chiang et al. | |
| 2015/0357626 A1 | 12/2015 | Holman et al. | |
| 2016/0013507 A1 | 1/2016 | Chiang et al. | |
| 2016/0020042 A1 | 1/2016 | Stanton et al. | |
| 2016/0056490 A1 | 2/2016 | Chiang et al. | |
| 2016/0056491 A1 | 2/2016 | Chiang et al. | |
| 2016/0105042 A1 | 4/2016 | Taylor et al. | |
| 2016/0126543 A1 | 5/2016 | Ota et al. | |
| 2016/0133916 A1 | 5/2016 | Zagars et al. | |
| 2016/0141593 A1 | 5/2016 | Min et al. | |
| 2016/0190544 A1 | 6/2016 | Slocum et al. | |
| 2016/0211502 A1 | 7/2016 | Choi et al. | |
| 2016/0218375 A1 | 7/2016 | Chiang et al. | |
| 2016/0240896 A1 | 8/2016 | Zhang et al. | |
| 2016/0268621 A1 | 9/2016 | Chiang et al. | |
| 2016/0308218 A1 | 10/2016 | Ota et al. | |
| 2016/0315301 A1 | 10/2016 | Kim et al. | |
| 2016/0344006 A1 | 11/2016 | Ota et al. | |
| 2016/0372802 A1 | 12/2016 | Chiang et al. | |
| 2017/0018798 A1 | 1/2017 | Tan et al. | |
| 2017/0025646 A1 | 1/2017 | Ota et al. | |
| 2017/0025674 A1 | 1/2017 | Tan et al. | |
| 2017/0033389 A1 | 2/2017 | Chiang et al. | |
| 2017/0033390 A1 | 2/2017 | Chiang et al. | |
| 2017/0077464 A1 | 3/2017 | Bazzarella et al. | |
| 2017/0162863 A1 | 6/2017 | Doherty et al. | |
| 2017/0214034 A1 | 7/2017 | Ota et al. | |
| 2017/0237111 A1 | 8/2017 | Holman et al. | |
| 2017/0237112 A1 | 8/2017 | Holman et al. | |
| 2017/0279108 A1 | 9/2017 | Grasselli | |
| 2017/0288281 A1 | 10/2017 | Chiang et al. | |
| 2018/0034090 A1 | 2/2018 | Chiang et al. | |
| 2018/0102521 A1 | 4/2018 | Cho et al. | |
| 2018/0175428 A1 | 6/2018 | Chiang et al. | |
| 2018/0175445 A1 | 6/2018 | Tan et al. | |
| 2018/0233708 A1 | 8/2018 | Bazzarella et al. | |
| 2018/0233722 A1 | 8/2018 | Holman et al. | |
| 2018/0287220 A1 | 10/2018 | Woodford et al. | |
| 2019/0058184 A1 | 2/2019 | Bazzarella et al. | |
| 2019/0245242 A1 | 8/2019 | Tan et al. | |
| 2019/0319460 A1 | 10/2019 | Taylor et al. | |
| 2019/0326562 A1 | 10/2019 | Ota et al. | |
| 2019/0348705 A1 | 11/2019 | Chen et al. | |
| 2019/0355998 A1 | 11/2019 | Chiang et al. | |
| 2019/0363351 A1 | 11/2019 | Ota et al. | |
| 2019/0393477 A1 | 12/2019 | Lawrence et al. | |
| 2020/0014025 A1 | 1/2020 | Zagars et al. | |
| 2020/0044296 A1 | 2/2020 | Chiang et al. | |
| 2020/0106094 A1 | 4/2020 | Ota et al. | |
| 2020/0161688 A1 | 5/2020 | Chaing et al. | |
| 2020/0220118 A1 | 7/2020 | Bazzarella et al. | |
| 2020/0220204 A1 | 7/2020 | Tan et al. | |
| 2020/0259338 A1 | 8/2020 | Taylor et al. | |
| 2020/0321597 A1 | 10/2020 | Zagars et al. | |
| 2020/0321601 A1 | 10/2020 | Slocum et al. | |
| 2020/0358129 A1 | 11/2020 | Chen et al. | |
| 2020/0411825 A1 | 12/2020 | Bazzarella et al. | |
| 2021/0091366 A1 | 3/2021 | Bazzarella et al. | |
| 2021/0167351 A1 | 6/2021 | Zagars et al. | |
| 2021/0226192 A1 | 7/2021 | Aranami et al. | |
| 2021/0249695 A1 | 8/2021 | Aranami et al. | |

(56) References Cited

U.S. PATENT DOCUMENTS

| | | |
|---|---|---|
| 2021/0265631 A1 | 8/2021 | Chen et al. |
| 2021/0384516 A1 | 12/2021 | Lawrence et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |

FOREIGN PATENT DOCUMENTS

| | | |
|---|---|---|
| CN | 1571882 A | 1/2005 |
| CN | 1598994 A | 3/2005 |
| CN | 101103509 A | 1/2008 |
| CN | 101595546 A | 12/2009 |
| CN | 101617419 A | 12/2009 |
| CN | 102460771 A | 5/2012 |
| CN | 102483046 A | 5/2012 |
| CN | 102800525 A | 11/2012 |
| CN | 106953059 A | 7/2017 |
| KR | 10-2013-0064465 | 6/2013 |
| KR | 10-2014-0012264 A | 2/2014 |
| TW | 533641 B | 5/2003 |
| WO | WO 2013/132228 | 9/2013 |
| WO | WO 2016/049213 A1 | 3/2016 |
| WO | WO 2016/132119 A1 | 8/2016 |
| WO | WO 2019/136467 A1 | 7/2019 |

OTHER PUBLICATIONS

Office Action for U.S. Appl. No. 15/886,281, dated Dec. 16, 2019, 15 pages.
Office Action for U.S. Appl. No. 15/886,281, dated Aug. 10, 2020, 26 pages.
Office Action for U.S. Appl. No. 15/941,673, dated Dec. 10, 2019, 7 pages.
Office Action for U.S. Appl. No. 16/104,480, dated Apr. 17, 2020, 10 pages.
International Search Report and Written Opinion for International Application No. PCT/US2018/016406, dated May 18, 2018, 11 pages.
International Search Report and Written Opinion for International Application No. PCT/US2018/025375, dated Jun. 27, 2018, 7 pages.
International Search Report and Written Opinion for International Application No. PCT/US2018/044378, dated Oct. 15, 2018, 8 pages.
Extended European Search Report for European Application No. 18748587.5, dated Feb. 8, 2021, 13 pages.
Cannarella, J. et al., "Stress evolution and capacity fade in constrained lithium-ion pouch cells," Journal of Power Sources, vol. 245, Jul. 2013, pp. 745-751.
Office Action for Chinese Application No. 201880061848.1, dated Aug. 3, 2021, 23 pages.
Office Action for U.S. Appl. No. 17/078,814, dated May 13, 2022, 20 pages.
International Search Report and Written Opinion for International Application No. PCT/US2020/049691, dated Dec. 15, 2020, 9 pages.
International Preliminary Reporton Patentability for International Application No. PCT/US2020/049691, dated Mar. 8, 2022, 7 pages.
Office Action for U.S. Appl. No. 15/886,281, dated Jun. 3, 2021, 26 pages.
Office Action for U.S. Appl. No. 15/886,281, dated Dec. 30, 2021, 20 pages.
Office Action for Chinese Application No. 201880018682.5, dated Sep. 26, 2021, 7 pages.
Office Action for Chinese Application No. 201880061848.1, dated Jun. 6, 2022, 20 pages.

\* cited by examiner

CURRENT INTERRUPT DEVICES USING SHAPE MEMORY MATERIALS

CROSS-REFERENCE TO RELATED APPLICATIONS

This application claims priority to, and the benefit of U.S. Provisional Application No. 62/539,156 filed on Jul. 31, 2017, titled "Current Interrupt Devices Using Shape Memory Materials," the contents of which are incorporated herein by reference in their entirety.

BACKGROUND

Current interrupt devices (CIDs) are often used as a safety feature for electrochemical cells to prevent overcharging and/or short-circuiting, which can lead to catastrophic failure of the electrochemical cell. Existing CIDs often use the internal pressure generated within the electrochemical cell as a means to interrupt or disconnect the active cell elements from the electrical current path. This method of current interruption can lead to gas exposure and often can still result in catastrophic failure for the electrochemical cell.

SUMMARY

Embodiments described herein relate to current interrupt devices (CIDs) for electrochemical cells that use a thermal trigger (e.g., shape memory and/or bi-metallic materials) to open an electrical circuit just prior to a thermal runaway or during a short-circuit event to prevent catastrophic failure of the electrochemical cell. Embodiments include CIDs comprising a housing, a bus bar coupled to the housing, and a thermal trigger operably coupled to the bus bar. In some embodiments, the bus bar can include an engineered fracture site. In some embodiments, the thermal trigger is dimensioned and configured to deform at a predetermined temperature to break the bus bar at the engineered fracture site. In some embodiments, a portion of the bus bar travels about a hinge, opening the electrical circuit and preventing overcharging, thermal runaway, and/or other catastrophic failure events.

DETAILED DESCRIPTION

Figure 1:
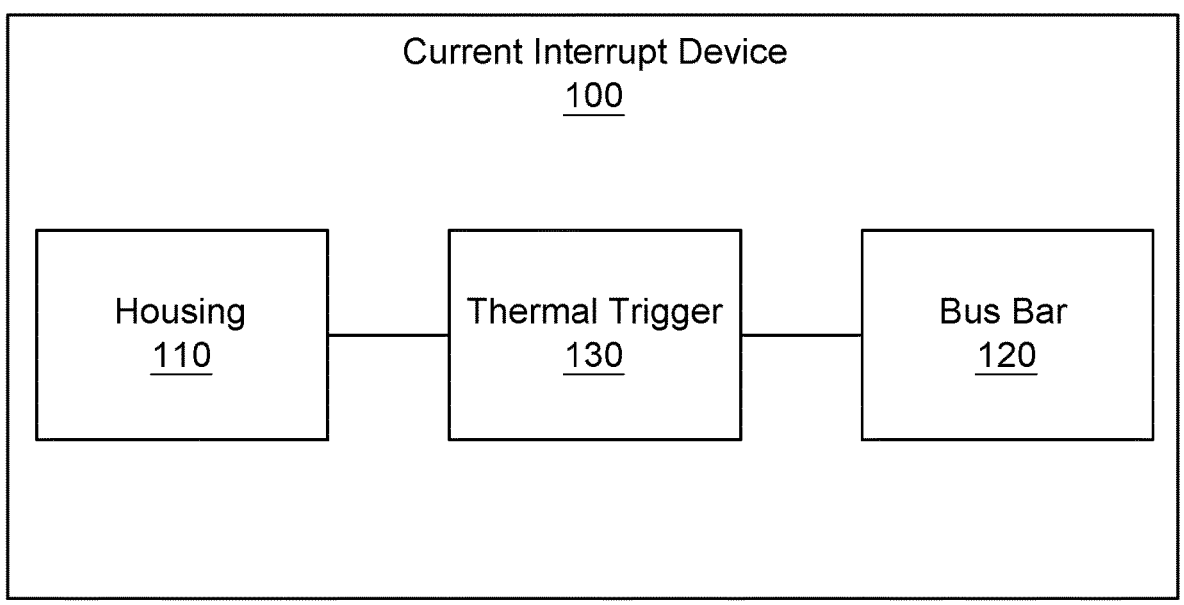
FIG. 1 is a schematic illustration of a current interrupt device, according to an embodiment.
Figure 2:
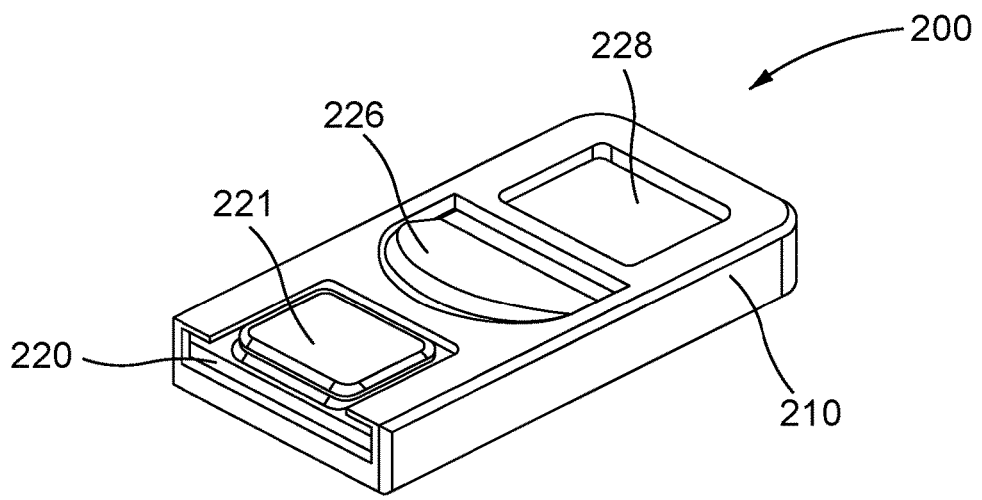
FIG. 2 is a perspective view of a current interrupt device, according to an embodiment.
Figure 3:
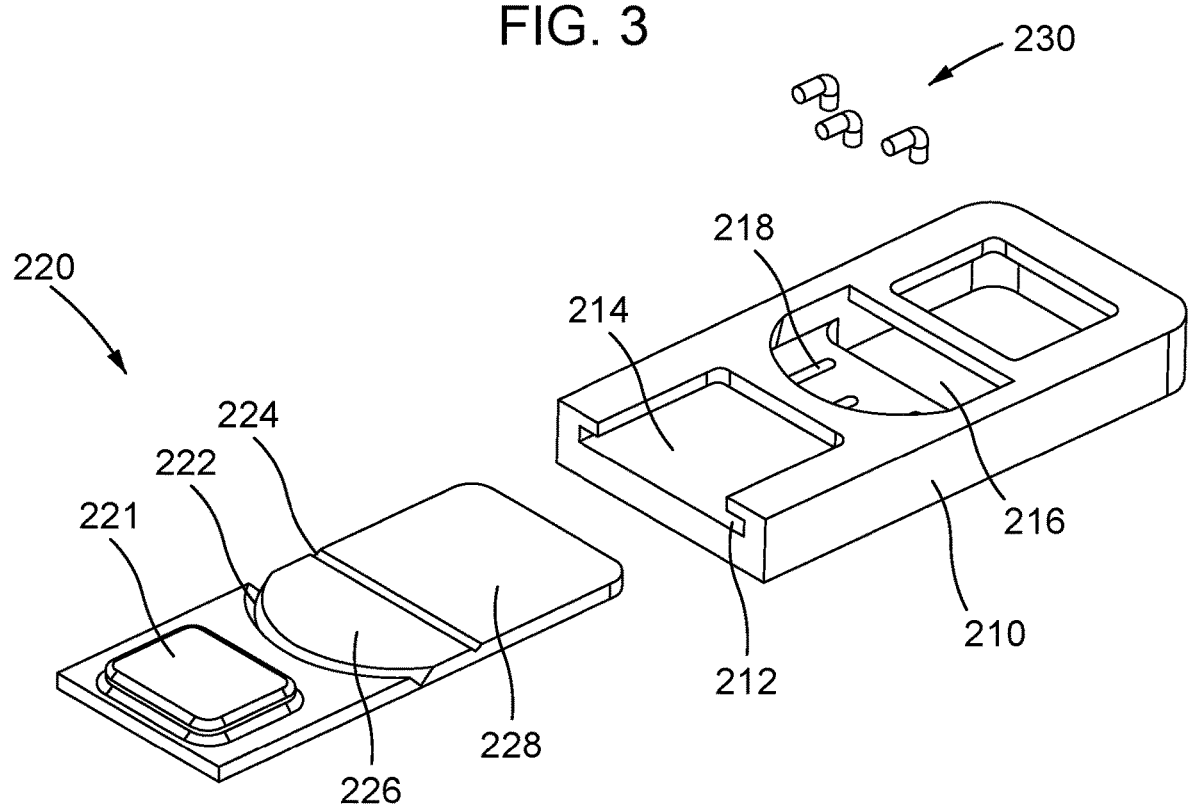
FIG. 3 is an exploded view of the current interrupt device of FIG. 2.
Figure 4A:
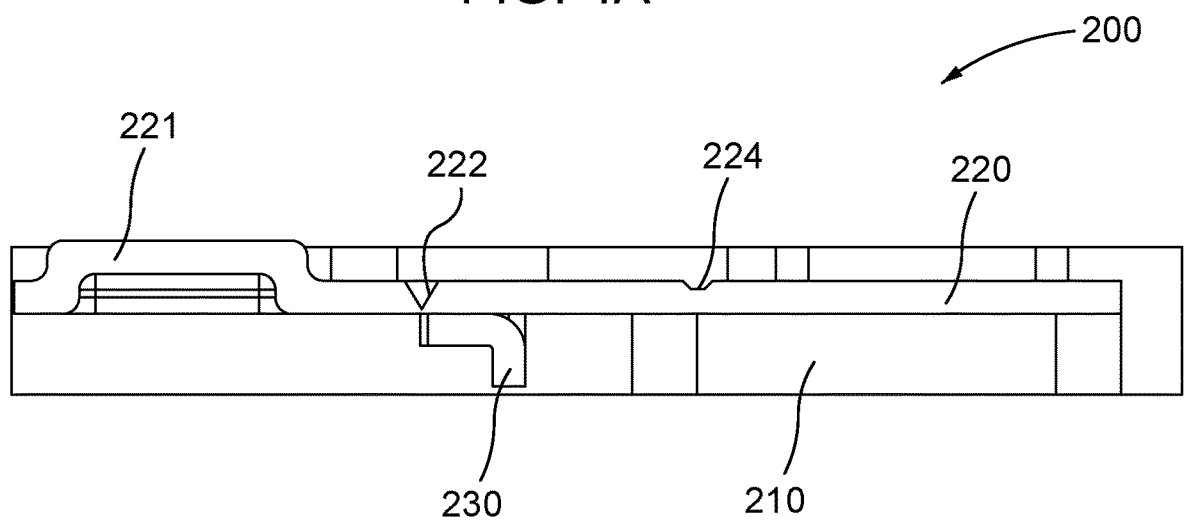
FIG. 4A is a cross-sectional view of the current interrupt device of FIG. 2 in a first configuration.
Figure 4B:
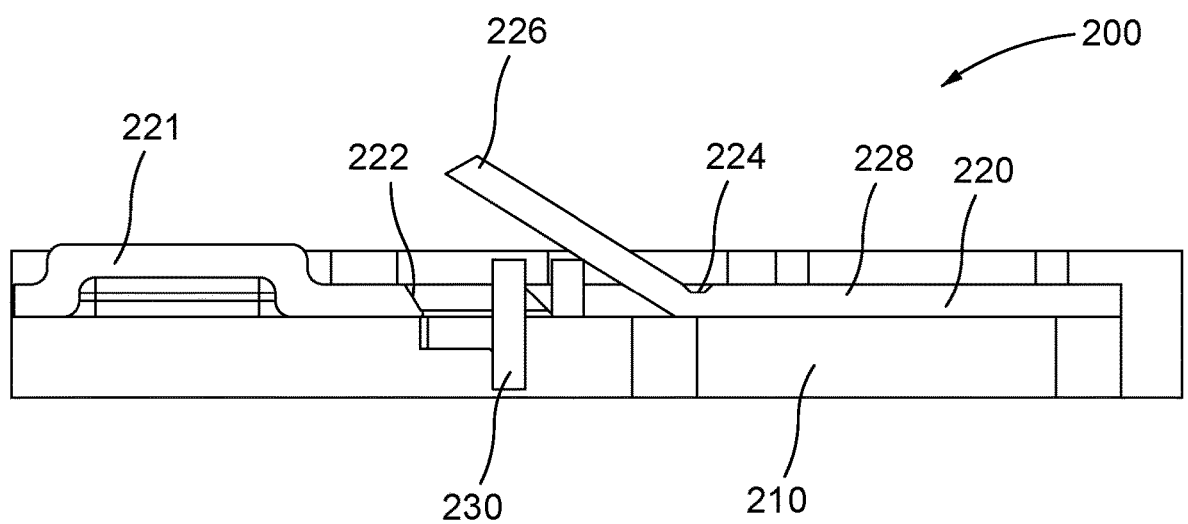
FIG. 4B is a cross-sectional view of the current interrupt device of FIG. 2 in a second configuration.

Embodiments described herein relate generally to safety devices for electrochemical cells, and specifically to a safer and more reliable current interrupt device (CID), the CID configured to discontinue current into or out of the electrochemical cell in response to an increase in the temperature of the electrochemical cell. Specifically, embodiments described herein relate to CIDs for electrochemical cells that use a thermal trigger (e.g., shape memory and/or bi-metallic materials that deform in response to a temperature rising above a predetermined threshold) to open an electrical circuit prior to thermal runaway or during a short-circuit event to prevent catastrophic failure of the electrochemical cell.

In electrochemical cell (e.g., lithium ion battery) design, safety is one of the primary areas of concern. In certain conditions where the cell is overcharged or short circuited, there is a potential for sudden release of stored energy resulting in catastrophic failure (i.e., explosion, fire, flying parts, etc.). To prevent catastrophic failure during these conditions it is desirable to interrupt the flow of energy into and out of the cell prior to thermal runaway or during a short-circuit event, terminating the electrochemical reactions that are causing or accentuating the failure state of the electrochemical cell. This can be accomplished in several ways, including physically disconnecting or breaking the electrical current path into the cell. Typical CIDs used in battery (e.g., lithium battery) applications are very costly and complex to implement, with suspect reliability.

In some embodiments, the CIDs described herein can be configured to disconnect or disrupt the flow of current into the cell once the CIDs or a component thereof (e.g., a thermal trigger) reaches a predetermined temperature threshold. In some embodiments, the CIDs can be engineered to disrupt the flow of current at a variety of temperatures and within a narrow temperature range, making the "failure" point more precise by reducing the lag between when the temperature reaches the predetermined temperature threshold and when the CID is activated. The CIDs described herein have fewer components than conventional CIDs, thereby increasing reliability and decreasing manufacturing costs. The CIDs described herein can also be disposed inside the electrochemical cell or external to the electrochemical cell and can be easily configured to be used on any existing cell packaging design, battery shape and/or size, and/or discharge/recharge parameters.

In some embodiments, the CIDs described herein can include a conductive element electrically coupled to a terminal of an electrochemical cell. In some embodiments, the CIDs can include a thermal trigger operably coupled to the conductive element. In some embodiments, the thermal trigger can be dimensioned and configured to deform at a predetermined temperature from a first configuration to a second configuration. In some embodiments, the deformation of the thermal trigger from the first configuration to the second configuration can cause the conductive element to fracture. In some embodiments, the conductive element can include an engineered fracture site configured to break as a result of deformation of the thermal trigger from the first configuration to the second configuration. In some embodiments, the conductive element can include a hinge disposed between the fixed portion and the movable portion of the conductive element. In some embodiments, the hinge can define an axis of rotation about which the movable portion of the conductive element travels from the first configuration to the second configuration. In some embodiments, the thermal trigger includes at least one of a shape memory alloy and a bi-metallic material. In some embodiments, the thermal trigger is made from nitinol or a nitinol alloy. In some embodiments, the conductive element is electrically coupled to a terminal of an electrochemical cell. In some embodiments, communication of an electrical current through the terminal is discontinued when the conductive element fractures.

In some embodiments, the CIDs described herein can include a conductive element including a movable portion separated from a fixed portion by a hinge. In some embodiments, the conductive element can be electrically coupled to a terminal of an electrochemical cell. In some embodiments, the CID can further include a thermal trigger positioned a distance from the conductive element in a first configuration. In some embodiments, the thermal trigger can be dimensioned and configured to deform at a predetermined temperature from the first configuration to a second configuration in which the thermal trigger causes the movable portion of the conductive element to move about the hinge. In some embodiments, the thermal trigger can include at least one of a shape memory alloy and a bi-metallic material. In some embodiments, the thermal trigger can be made from nitinol or a nitinol alloy. In some embodiments, communication of an electrical current through the terminal is discontinued when the movable portion of the conductive element moves about the hinge.

FIG. 1 is a schematic illustration of a CID 100 configured to be operably coupled to an electrochemical cell (not shown) to prevent at least one of short-circuiting, thermal runaway, overcharging, an overvoltage condition, or an overcurrent condition. In some embodiments, the CID 100 can be connected to a positive terminal or negative terminal of the electrochemical cell. In some embodiments, the CID 100 or a component thereof is operably integrated into one of the positive terminal or negative terminal of the electrochemical cell. In some embodiments, the CID 100 can be in electrical communication with the electrochemical cell and/or an external electrical source or load. In some embodiments, the CID 100 can be in thermal communication with the electrochemical cell such that the operating temperature of the electrochemical cell, an electrode thereof, or a housing enclosing the electrochemical cell can be substantially similar to the temperature of the CID 100 or a component thereof. In some embodiments, the CID 100 can be configured to allow the transfer of electrical current between the electrochemical cell and a load (e.g., device powered by the electrochemical cell) during discharge or an external source of electrical energy and the electrochemical cell during recharging. In some embodiments, the CID 100 can be maintained in sufficiently close proximity to the electrochemical cell such that thermal energy generated by the electrochemical cell and communicated to the CID 100 will cause the activation of the CID 100. In other words, if an electrochemical cell experiences one of, at least one of, or all of a thermal runaway event, a short-circuiting event, an overcharging event, physical damage that causes any of these, or if general overheating due to external temperature change occurs, the CID 100, being sufficiently positioned nearby the electrochemical cell, can be configured to open the electrical circuit to prevent catastrophic failure of the electrochemical cell.

In some embodiments, the CID 100 can include a housing 110, a bus bar 120 coupled to the housing 110, and a thermal trigger 130 operably coupled to the bus bar 120. In some embodiments, the housing 110 can be any suitable shape or form-factor, including but not limited to, square, rectangular, prismatic, cylindrical, any combination thereof, or any other shape or configuration suitable for an electrochemical cell. In some embodiments, the housing 110 can be electrically insulating. In some embodiments, the housing 110 can be configured to be physically coupled to the electrochemical cell. In some embodiments, the housing 110 can have a first aperture (not shown) through which a terminal (not shown) of the bus bar 120 is exposed for connection to a recharging source and/or an outside load. In some embodiments, the housing 110 has a second aperture (not shown) which can allow for a portion of the bus bar 120 to move when the CID 100 is activated.

In some embodiments, the housing 110 can be made from any suitably durable and suitably insulating material. In some embodiments, the housing 110 can be made from any of a polymer, a plastic, ceramic, glass, fiberglass, acrylonitrile-butadiene-styrene, acetate, acrylic, polymerized formaldehyde, epoxy-fiberglass laminate, polystyrene, high impact polystyrene, polyimide, fluoropolymer, polyvinylidene fluoride, melamine laminated with woven glass, unfilled polyimide, mica, rubber, neoprene, aromatic polyamides, nylon, polyetheretherketone, polyethylene terephthalate, glycol-modified polyethylene terephthalate, phenolics, perfluoroalkoxy, polycarbonates, polyesters, polyolefins, polysulfones, polyurethanes, polytetrafluoroethylene, crosslinked polystyrene, polyphenylene sulfide, silicone-fiberglass resin, unfilled polyetherimide, vulcanized rubber, vulcanized fiber, dacron, mylar, polyvinylfluoride, polychlorinated biphenyls, and combinations thereof.

In some embodiments, the bus bar 120 can be disposed on or substantially on the housing 110. In some embodiments, the bus bar 120 can be disposed within, substantially within, at least partially within the housing 110. In some embodiments, the bus bar 120 can be dimensioned and configured to allow the transfer of electrical energy between the electrochemical cell and the external source during recharging of the electrochemical cell or between the electrochemical cell and the external load (e.g., device being powered by the electrochemical cell) during discharge. In some embodiments, the bus bar 120 can be operably coupled to the positive terminal of the electrochemical cell or the negative terminal of the electrochemical cell. In some embodiments, the bus bar 120 can connect one of the positive terminal and the negative terminal of the electrochemical cell to a system level busing (e.g., of a battery pack or battery module).

In some embodiments, the bus bar 120 can be made from any conductive material that is durable enough to remain intact during normal operation of the electrochemical cell and that will fracture at an engineered fracture site (not shown) due to mechanical stress. In some embodiments, the bus bar 120 can be made from any of silver, copper, gold, aluminum, molybdenum, zinc, lithium, tungsten, brass, carbon-based materials, nickel, iron, palladium, platinum, tin, bronze, carbon steel, lead, titanium, stainless steel, any other suitable conductive material, and any alloy, admixture, or combination thereof.

In some embodiments, the bus bar 120 can include a fixed portion (not shown) and a movable portion (not shown). The fixed portion can be coupled to the housing 110, and the movable portion can be substantially unconstrained by the housing 110. In other words, the fixed portion can be configured to be permanently coupled to the housing 110, and the movable portion can be moved with respect to the housing 110 and/or the fixed portion in response to an external force (e.g., from the thermal trigger 130). In some embodiments, the displacement of the movable portion from a first position to a second position may cause the bus bar 120 to break, thereby separating the movable portion of the bus bar 120 from the fixed portion of the bus bar 120 and disconnecting the electrical circuit, thereby preventing any further transfer of electrical energy into or out of the electrochemical cell. In some embodiments, the bus bar 120 can be configured to break at the engineered fracture site. In some embodiments, the engineered fracture site can be a groove, etched line, furrow, rut, trench, indentation, hollow, or other such depression. In some embodiments, the engineered fracture site can be a thinned portion of the bus bar 120. In some embodiments, the bus bar 120 can be tempered or otherwise treated to improve mechanical properties, with the exception of the engineered fracture site such that bus bar 120 is designed to break at the engineered fracture site before mechanical failure of other portions of the bus bar 120 occur. In some embodiments, the bus bar 120 can be formed from a first material or materials and the engineered fracture site can be formed from a second material or materials, the second material or materials having a mechanical property different than the first material or materials such that the bus bar 120 fails at the engineered fracture site under mechanical stress. In some embodiments, once the bus bar 120 is broken (e.g., at the engineered fracture site) and the electrical current into or out of the electrochemical cell is discontinued, the detrimental thermal and/or electrical event that was occurring is stopped, substantially stopped, slowed, or temporarily discontinued and catastrophic failure is avoided.

In some embodiments, the thermal trigger 130 can be coupled to the housing 110 and/or the bus bar 120 and configured to deform at a predetermined temperature threshold or within a predetermined temperature threshold range. In some embodiments, the thermal trigger 130 can be positioned and configured such that deformation of the thermal trigger 130 supplies mechanical stress to the movable portion of the bus bar 120. In some embodiments, the mechanical stress supplied to the movable portion of the bus bar 120 can cause the bus bar 120 to break or substantially break at the engineered fracture site or elsewhere. In some embodiments, the mechanical stress supplied to the movable portion of the bus bar 120 can cause the displacement of the movable portion of the bus bar 120, causing the movable portion to move away from the fixed portion and discontinuing electrical current into or out of the electrochemical cell. In some embodiments, the thermal trigger 130 causes the bus bar 120 to fracture due to mechanical stress caused by controlled deformation of the thermal trigger 130 in response to temperature change. In some embodiments, the fracture can be any of a brittle fracture, a ductile fracture, a slip fracture, a creep rupture failure, buckling failure, any other failure type, or combinations thereof. In some embodiments, the thermal trigger 130 can deform at the predetermined temperature, causing an intermediary feature, mechanism, or device to cause the bus bar 120 to fracture. In some embodiments, the thermal trigger 130 can deform at the predetermined temperature, causing the movable portion of the bus bar 120 to be moved translationally or rectilinearly away from the terminal. In some embodiments, deformation of the thermal trigger 130 at the predetermined temperature can initiate a chemical and/or thermal event that results in the disconnection of the electrical circuit. In some embodiments, deformation of the thermal trigger 130 at the predetermined temperature can cause the bus bar 120 to short-circuit, discontinuing electrical current coming from or going to the electrochemical cell. In some embodiments, the bus bar 120 can be engineered to have a precise strain resistance and to be brittle such that deformation of the thermal trigger 130 at the predetermined temperature can cause the bus bar 120 to shatter. In some embodiments, the bus bar 120 can be engineered to be at least somewhat resistant to electrical current such that, above a particular current level and/or voltage, the bus bar 120 can heat up, causing the thermal trigger 130 to deform and break the bus bar 120.

In some embodiments, the thermal trigger 130 can be engineered to transition between a plurality of configurations in response to the temperature of the thermal trigger 130 reaching or exceeding a predetermined temperature or a predetermined temperature range. In some embodiments, the thermal trigger 130 can have a first configuration below the predetermined temperature or predetermined temperature range, and second configuration at or above the predetermined temperature or predetermined temperature range. In some embodiments, the first configuration is a bent configuration. In some embodiments, the second configuration is an extended configuration. In some embodiments, the first configuration is an extended configuration and the second configuration is a bent configuration. In some embodiments, the first configuration is a more tightly coiled configuration and the second configuration is a less tightly coiled configuration. In some embodiments, the first configuration is a compressed configuration and the second configuration is a stretched or extended configuration. In some embodiments, the first configuration is a folded configuration and the second configuration is an unfolded configuration. In some embodiments, the first configuration is a wound configuration and the second configuration is an unwound configuration. In some embodiments, the first configuration is a flat configuration and the second configuration is a rounded configuration. In some embodiments, the first configuration is an unstructured configuration and the second configuration is a structured configuration. In some embodiments, the first configuration is a compressible configuration and the second configuration is a non-compressible configuration. In some embodiments, the first configuration is a deflated configuration and the second configuration is an inflated configuration. In some embodiments, the first configuration is a rounded configuration and the second configuration is a squared-off configuration. In some embodiments, the thermal trigger 130 can be super-elastic at temperatures below the predetermined temperature and revert back to a straight annealed shape at or above the predetermined temperature.

In some embodiments, the thermal trigger 130 can include or be formed from a shape memory material such that the thermal trigger 130 has shape memory characteristics. In some embodiments, the shape memory characteristics of the thermal trigger 130 can lead to irreversible deformation. In other words, in some embodiments, the thermal trigger 130 can move from the first configuration to the second configuration at the predetermined temperature, however if the temperature subsequently drops below the predetermined temperature the thermal trigger 130 may remain in the second configuration. In some embodiments, the thermal trigger 130 has reversible shape memory characteristics, meaning the thermal trigger 130 may remain in the second configuration while the temperature of the thermal trigger 130 remains at or above the predetermined temperature and may return to the first configuration once the temperature returns to below the predetermined temperature.

In some embodiments, deformation of the thermal trigger 130 causes the movable portion of the bus bar 120 to move about an axis in a hinge-like fashion. In some embodiments, the axis is a hinge (not shown) in the bus bar 120. In some embodiments, the hinge can be approximately parallel to the engineered fracture site. In some embodiments, the distance of travel of the movable portion of the bus bar 120 from the fixed portion of the bus bar 120 is determined at least in part by the distance of travel of the thermal trigger 130. In some embodiments, the distance of travel of the movable portion of the bus bar 120 can also be determined in part due to the distance between the hinge and the engineered fracture site. In some embodiments, the hinge in the bus bar 120 can be defined by a weakening of a portion of the bus bar 120, for example by removing material from the bus bar 120. In some embodiments, the hinge can be defined by scoring the portion of the bus bar 120. In some embodiments, the hinge can be defined by heat treating the portion of the bus bar 120. In some embodiments, the hinge can be defined by chemically treating the portion of the bus bar 120. In some embodiments, the bus bar 120 can be formed from a first portion and a second portion, the first and second portions coupled at a region, the coupling region defining a natural hinge point. In some embodiments, the portion of the bus bar 120 can be mechanically worked such that stress/strain impacts can cause the formation of the hinge.

In some embodiments, the thermal trigger 130 can be positioned between the housing 110 and the bus bar 120 such that the extent and direction of travel of the thermal trigger 130 due to thermal deformation of the thermal trigger 130 is controlled by the position of the thermal trigger 130 relative to the housing 110 and the bus bar 120. In some embodiments, the thermal trigger 130 can be coupled to the housing 110. In some embodiments, the thermal trigger 130 can be coupled to the bus bar 120. In some embodiments, the thermal trigger 130 can be coupled to the housing 110 and the bus bar 120. In some embodiments, the housing 110 and/or the bus bar 120 can include a cavity (not shown) into which the thermal trigger 130 can be at least partially disposed. In some embodiments, the thermal trigger 130 is adhered to the housing 110 and/or the bus bar 120 using a chemical bonding agent, a thermal fusing process, a high frictional coefficient caused by low engineering tolerance between the size of the cavity and the size of the thermal trigger 130, and any other suitable process or combination thereof. In some embodiments, the housing 110 can include a notch (not shown) that corresponds to the hinge on the bus bar 120 such that the notch and the hinge together provide an axis about which the movable portion of the bus bar 120 rotates after fracture of the bus bar 120.

In some embodiments, the thermal trigger 130 is made from a material that deforms predictably at a particular temperature. In some embodiments, the material used to form the thermal trigger 130 can be shape memory alloys (SMAs), nickel titanium alloys, nitinol alloys, nitinol 55, nitinol 60, nitinol-copper alloys, nitinol-niobium alloys, copper-aluminum-nickel alloys, zinc-copper-gold-iron alloys, Fe—Mn—Si alloys, Cu—Zn—Al alloys, Cu—Al—Ni alloys, Ag—Cd, Ag—Cd 44/49 at. % Cd, Au—Cd, Au—Cd 46.5/50 at. % Cd, Cu—Al—Ni, Cu—Al—Ni 14/14.5 wt % Al and 3/4.5 wt % Ni, Cu—Sn, Cu—Sn having approximately 15 at % Sn, Cu—Zn, Cu—Zn 38.5/41.5 wt. % Zn, Cu—Zn—X (where X is at least one of Si, Al, or Sn), Fe—Pt, Fe—Pt having approximately 25 at. % Pt, Mn—Cu, Mn—Cu 5/35 at % Cu, Fe—Mn—Si, Co—Ni—Al, Co—Ni—Ga, Ni—Fe—Ga, Ti—Nb, Ni—Ti, Ni—Ti having approximately 55-60 wt % Ni, Ni—Ti—Hf, Ni—Ti—Pd, Ni—Mn—Ga, any suitable bi-metallic alloy, Cu—Cu, Al—Al, and any combination thereof.

In some embodiments, the thermal trigger 130 can be any suitable shape such that configurational change from the first configuration to the second configuration achieves the desired fracture of the bus bar 120 and desired distance of travel of the movable portion. In some embodiments, suitable shapes for the thermal trigger 130 can include any of rectangular, cylindrical, square, tab, oblong, circular, triangular, wire, sheet, rod, ribbon, tube, ring, foil, helical coil springs, or any combination thereof. In some embodiments, the thermal trigger 130 can be formed using any suitable method, including but not limited to hot working, cold working, super elastic strain annealing, flat strain annealing, shape set strain annealing, or any combination thereof. In some embodiments, the thermal trigger 130 may form a natural oxide on the surface, for instance $TiO_2$ in the case of nitinol and nitinol alloys.

In some embodiments, the thermal trigger 130 can be a single element. In some embodiments, the thermal trigger 130 can be a plurality of elements. In some embodiments, the plurality of elements that comprise the thermal trigger 130 can be two, three, four, five, six or more elements. In some embodiments, the thermal trigger 130 can be a single component having a single portion. In some embodiments, the thermal trigger 130 can include a plurality of components operably coupled to form the thermal trigger 130. In some embodiments, the thermal trigger 130 can include a plurality of portions, for example of the same material, coupled to form the thermal trigger 130. In some embodiments, the thermal trigger 130 can be coated in a material to make it electrically insulating. For example, the thermal trigger 130 can be coated in a polymer, a synthetic rubber material, a natural rubber material, a ceramic coating, an organic material, an organometallic, a non-conductive metal, or a metal that is less conductive than the thermal trigger 130 itself. In some embodiments, the thermal trigger 130 can include or be formed from a material or a plurality of materials that is or are electrically insulating.

In some embodiments, the predetermined temperature at which the thermal trigger 130 deforms can be between about 40° C. and about 200° C., between about 45° C. and about 190° C., between about 50° C. and about 180° C., between about 55° C. and about 170° C., between about 60° C. and about 160° C., between about 65° C. and about 150° C., between about 70° C. and about 145° C., between about 75° C. and about 140° C., between about 80° C. and about 135° C., between about 85° C. and about 130° C., between about 90° C. and about 125° C., between about 95° C. and about 120° C., between about 100° C. and about 115° C., between about 40° C. and about 190° C., between about 40° C. and about 180° C., between about 40° C. and about 170° C., between about 40° C. and about 160° C., between about 40° C. and about 150° C., between about 40° C. and about 140° C., between about 40° C. and about 130° C., between about 40° C. and about 120° C., between about 40° C. and about 110° C., between about 40° C. and about 100° C., between about 40° C. and about 90° C., between about 40° C. and about 80° C., between about 40° C. and about 70° C., between about 40° C. and about 60° C., between about 40° C. and about 50° C., between about 50° C. and about 200° C., between about 60° C. and about 200° C., between about 70° C. and about 200° C., between about 80° C. and about 200° C., between about 90° C. and about 200° C., between about 100° C. and about 200° C., between about 110° C. and about 200° C., between about 120° C. and about 200° C., between about 130° C. and about 200° C., between about 140° C. and about 200° C., between about 150° C. and about 200° C., between about 160° C. and about 200° C., between about 170° C. and about 200° C., between about 180° C. and about 200° C., or between about 190° C. and about 200° C., inclusive of all values and ranges therebetween. In some embodiments, the predetermined temperature at which the thermal trigger 130 deforms can be above about 45° C., above about 50° C., above about 55° C., above about 60° C., above about 65° C., above about 70° C., above about 75° C., above about 80° C., above about 85° C., above about 90° C., above about 95° C., above about 100° C., above about 105° C., above about 110° C., above about 115° C., above about 120° C., above about 125° C., above about 130° C., above about 135° C., above about 140° C., above about 145° C., and above about 150° C., inclusive of all ranges and values therebetween. In some embodiments, the predetermined temperature at which the thermal trigger 130 deforms can be below about 200° C., below about 190° C., below about 180° C., below about 170° C., below about 160° C., below about 150° C., below about 145° C., below about 140° C., below about 135° C., below about 130° C., below about 125° C., below about 120° C., below about 115° C., below about 110° C., below about 105° C., below about 100° C., below about 95° C., below about 90° C., below about 85° C., below about 80° C., below about 75° C., below about 70° C., below about 65° C., below about 60° C., below about 55° C., below about 50° C., below about 45° C., or below about 40° C., inclusive of all values and ranges therebetween.

In some embodiments, the thermal trigger 130 predictably deforms within a range of temperatures around the predetermined temperature. In some embodiments, the range of temperatures is ±1° C., ±2° C., ±3° C., ±4° C., ±5° C., ±6° C., ±7° C., ±8° C., ±9° C., or ±10° C., inclusive of all ranges and values therebetween.

In some embodiments, the distance of travel of the movable portion of the bus bar 120 can be caused either directly or indirectly by the deformation of the thermal trigger 130. In some embodiments, the distance of travel of the movable portion of the bus bar 120 can be less than about 0.1 mm, 0.2 mm, 0.3 mm, 0.4 mm, 0.5 mm, 0.6 mm, 0.7 mm, 0.8 mm, 0.9 mm, 1 mm, 2 mm, 3 mm, 4 mm, 5 mm, 6 mm, 7 mm, 8 mm, 9 mm, 10 mm, 11 mm, 12 mm, 13 mm, 14 mm, or 15 mm, inclusive of all values and ranges therebetween. In some embodiments, the distance of travel of the movable portion of the bus bar 120 can be greater than about 1 mm, 2 mm, 3 mm, 4 mm, 5 mm, 6 mm, 7 mm, 8 mm, 9 mm, 10 mm, 11 mm, 12 mm, 13 mm, 14 mm, or 15 mm, inclusive of all values and ranges therebetween. In some embodiments, the distance of travel of the movable portion of the bus bar 120 can be between about 0.1 mm and about 15 mm, about 0.2 mm and about 14 mm, about 0.3 mm and about 13 mm, about 0.4 mm and about 12 mm, about 0.5 mm and about 11 mm, about 1 mm and about 10 mm, about 2 mm and about 9 mm, about 3 mm and about 8 mm, about 4 mm and about 7 mm, about 5 mm and about 6 mm, about 0.1 mm and about 14 mm, about 0.1 mm and about 13 mm, about 0.1 mm and about 12 mm, about 0.1 mm and about 11 mm, about 0.1 mm and about 10 mm, about 0.1 mm and about 9 mm, about 0.1 mm and about 8 mm, about 0.1 mm and about 7 mm, about 0.1 mm and about 6 mm, about 0.1 mm and about 5 mm, about 0.1 mm and about 4 mm, about 0.1 mm and about 3 mm, about 0.1 mm and about 2 mm, about 0.1 mm and about 1 mm, about 0.1 mm and about 0.9 mm, about 0.1 mm and about 0.8 mm, about 0.1 mm and about 0.7 mm, about 0.1 mm and about 0.6 mm, about 0.1 mm and about 0.5 mm, about 0.1 mm and about 0.4 mm, about 0.1 mm and about 0.3 mm, about 0.1 mm and about 0.2 mm, about 0.2 mm and about 15 mm, about 0.3 mm and about 15 mm, about 0.4 mm and about 15 mm, about 0.5 mm and about 15 mm, about 0.6 mm and about 15 mm, about 0.7 mm and about 15 mm, about 0.8 mm and about 15 mm, about 0.9 mm and about 15 mm, about 1 mm and about 15 mm, about 2 mm and about 15 mm, about 3 mm and about 15 mm, about 4 mm and about 15 mm, about 5 mm and about 15 mm, about 6 mm and about 15 mm, about 7 mm and about 15 mm, about 8 mm and about 15 mm, about 9 mm and about 15 mm, about 10 mm and about 15 mm, about 11 mm and about 15 mm, about 12 mm and about 15 mm, about 13 mm and about 15 mm, or about 14 mm and about 15 mm, inclusive of all values and ranges therebetween.

In some embodiments, the duration of time within which the thermal trigger 130 moves from the first configuration to the second configuration can be less than about 1 second, less than about 2 seconds, less than about 3 seconds, less than about 4 seconds, less than about 5 seconds, less than about 6 seconds, less than about 7 seconds, less than about 8 seconds, less than about 9 seconds, less than about 10 seconds, less than about 15 seconds, less than about 20 seconds, less than about 25 seconds, less than about 30 seconds, or less than about 1 minute, inclusive of all ranges and values therebetween. In some embodiments, the duration of time within which the thermal trigger 130 moves from the first configuration to the second configuration can be greater than about 1 seconds, greater than about 2 seconds, greater than about 3 seconds, greater than about 4 seconds, greater than about 5 seconds, greater than about 6 seconds, greater than about 7 seconds, greater than about 8 seconds, greater than about 9 seconds, greater than about 10 seconds, greater than about 15 seconds, greater than about 20 seconds, greater than about 25 seconds, greater than about 30 seconds, or greater than about 1 minute, inclusive of all values and ranges therebetween.

In some embodiments, there can be a time lag between when the thermal trigger 130 reaches or exceeds the predetermined temperature or predetermined temperature range and when the thermal trigger 130 transitions from the first configuration to the second configuration. In some embodiments, the time lag can be less than about 30 seconds, less than about 25 seconds, less than about 20 seconds, less than about 15 seconds, less than about 10 seconds, less than about 9 seconds, less than about 8 seconds, less than about 7 seconds, less than about 6 seconds, less than about 5 seconds, less than about 4 seconds, less than about 3 seconds, less than about 2 seconds, or less than about 1 second, inclusive of all values and ranges therebetween.

By way of example only, nitinol can be used as the thermal trigger 130, according to an embodiment. Nitinol is a superelastic shape memory alloy at standard temperatures and therefore can be easily manipulated into any shape or configuration in the Martensitic form. However, when the alloy is heated to above a set temperature the nitinol reverts back to the Austenitic shape. Whereas the Martensitic form of nitinol is weak and undergoes strain in response to stress, the Austenitic shape is very strong, having a yield strength of between about 35,000 and 100,000 psi depending upon the alloy composition. Austenitic nitinol may have a Young's modulus of about 83 GPa, an ultimate tensile strength after being work hardened of 1900 MPa, a Poisson's ratio of about 0.33, and an elongation at failure of between about 5% and about 10%. Nitinol wire may be heat treated in the extended, second configuration while constrained to that shape and then cooled to room temperature such that it can easily be formed into the desired first configuration at room temperature and disposed within the housing 110 of the CID 100. Heat treating of nitinol may be accomplished at temperatures as low as 400° C. and times as short as 1-2 minutes, however heat treating can also require a temperature closer to 500° C. and times over 5 minutes. The heat treated nitinol can then be rapidly cooled via a water quench in order to set the Austenitic shape. Adjusting the heat treating temperature and duration may change the temperature at which the nitinol transitions from the Martensitic to Austenitic shape. Changing the concentration of nickel to titanium in the nitinol, even slightly, can also result in very large changes in the temperature at which nitinol changes from the Martensitic to Austenitic shape. Once heat treated and subsequently cooled, the nitinol is again malleable and can be shaped in to the desired first configuration. Upon an increase in the temperature of the nitinol wire within the CID 100 due to a thermal event within an electrochemical cell the nitinol wire reverts back to the second configuration quickly enough and with a high enough yield strength to fracture the bus bar 120 at the engineered fracture site and open the electrical circuit.

In some embodiments, the CID 100 is operably coupled to an electrochemical cell such that the CID 100 can be activated to discontinue discharge or charging of the electrochemical cell in response to over-temperature conditions. In some embodiments, the actuation of the thermal trigger 130 leading to the opening of the electrical circuit may occur after an electrochemical cell to which the CID 100 is operably coupled has already been irreversibly damaged. In some embodiments, the actuation of the thermal trigger 130 occurs at a low enough temperature such that an electrochemical cell to which the CID 100 is operably coupled is not irreversibly damaged. In other words, in some embodiments, activation of the CID 100 may reduce the risk of irreversible damage to the electrochemical cell. In some embodiments, the CID 100 can be resettable or replaceable. In some embodiments, if the CID 100 is activated and electrochemical cell is protected from irreversible damage or catastrophic failure (e.g., thermal runaway), the CID 100 or a component thereof can be replaced and the electrochemical cell can be returned to operation. In some embodiments, the whole CID 100 can be replaced to return the electrochemical cell to operation. In some embodiments, the bus bar 120 can be replaced to return the CID 100 to its original pre-activation condition and to return to the electrochemical cell to operation. In some embodiments, the bus bar 120 and the thermal trigger 130 can be replaced to return the CID 100 to its original pre-activation condition and to return the electrochemical cell to operation.

FIGS. 2, 3, and 4A-4B illustrate a CID 200 similar to the CID 100 described above, being configured to improve safety and reduce the likelihood of overcharging and/or short-circuiting in an electrochemical cell. In some embodiments, portions and/or aspects of the CID 200 are substantially similar in form and/or function to the corresponding portions and/or aspects of the CID 100 described above with reference to FIG. 1. Accordingly, such similar portions and/or aspects are not described in further detail herein.

In some embodiments, the CID 200 is connected to a positive or negative lead of an electrochemical cell. In some embodiments, the CID 200 or a component thereof is the positive or negative lead of an electrochemical cell. In other words, the CID 200 can be in electrical communication with an electrochemical cell and/or an external electrical source or load. The CID 200 is configured to allow the transfer electrical energy between an electrochemical cell and a device being powered or an external source of electrical energy and the electrochemical cell during recharging. In some embodiments, the CID 200 can be maintained in sufficiently close proximity to an electrochemical cell such that any thermal energy discharge from the electrochemical cell will cause the CID 200 to undergo a timely temperature change. In other words, if an electrochemical cell experiences any of a thermal runaway event, a short-circuiting event, an overcharging event, over-current conditions, over-voltage conditions, physical damage that causes any of these, or if general overheating due to external temperature change occurs, the CID 200 can be positioned nearby the electrochemical cell and can open the electrical circuit to prevent catastrophic failure of the electrochemical cell. In some embodiments, the CID 200 can include a resistor (not shown) such that during over-current or over-voltage conditions, the resistor can heat up, causing the thermal trigger 230 to heat up to at or above the predetermined temperature. In some embodiments, a component of the CID 200, e.g., the bus bar 230, can have resistive properties or characteristics such that above a predetermined current level or a predetermined voltage level, the resistive component can heat up, causing the thermal trigger 230 to heat up to at or above the predetermined temperature.

In some embodiments, the CID 200 includes a housing 210, a bus bar 220 coupled to the housing 210, and a thermal trigger 230 operably coupled to the bus bar 220. In some embodiments, the housing 210 can be any suitable shape or form-factor, including but not limited to, square, rectangular, prismatic, cylindrical, any combination thereof, or any other shape or configuration suitable for an electrochemical cell. In some embodiments, the housing 210 can be electrically insulating. In some embodiments, the housing 210 can be configured to easily attach to an electrochemical cell.

In some embodiments, the bus bar 220 is disposed on or at least partially in the housing 210, and is configured to allow the transfer of electrical energy between an electrochemical cell and the external source during recharge or external load during discharge. In some embodiments, the bus bar 220 is dimensioned and configured to connect to either the positive or negative lead of an electrochemical cell. In some embodiments, the bus bar 220 can connect a lead of an electrochemical cell and a system level busing (e.g., of a battery pack or battery module).

In some embodiments, the bus bar 220 can include a terminal 221, a movable portion 226, and a fixed portion 228. The fixed portion 228 can be coupled to the housing 210, and the movable portion 226 can be substantially unconstrained by the housing 210. In other words, the fixed portion 228 can be configured to be permanently coupled to the housing 210, and the movable portion 226 can be moved with respect to the housing 210 and/or the fixed portion 228 in response to an external force (e.g., from the thermal trigger 230).

In some embodiments, the housing 210 is dimensioned and configured to have a guide 212 into which a bus bar 220 can be slidably disposed. In some embodiments, the housing 210 has a first aperture 214 through which the terminal 221 of the bus bar 220 is exposed for connection to a recharging source and/or outside load. In some embodiments, the housing 210 has a second aperture 216 configured to be aligned with the movable portion 226 of the bus bar 220 to allow the movable portion 226 to be moved through the second aperture 216. The displacement of the movable portion 226 from a first position to a second position causes the bus bar 220 to break, thereby opening the electrical circuit and preventing any further transfer of electrical energy into or out of the electrochemical cell. In some embodiments, the bus bar 220 can be configured to break at an engineered fracture site 222. In some embodiments, the engineered fracture site 222 can be a groove, furrow, rut, trench, indentation, hollow, or other such depression. Once the bus bar 220 is broken and the electrical circuit is open, the detrimental thermal and/or electrical event that was occurring is stopped and catastrophic failure of the electrochemical cell is avoided.

The thermal trigger 230 can be coupled to the housing 210 and/or the bus bar 220 and is configured to deform at a predetermined temperature or within a predetermined temperature range. Deformation of the thermal trigger 230 can cause displacement of the movable portion 226 of the bus bar 220, thereby causing the electrical circuit formed in part by the bus bar 220 to open. In some embodiments, the thermal trigger 230 causes the bus bar 220 to fracture due to mechanical stress caused by controlled deformation of the thermal trigger 230 in response to temperature change. In some embodiments, the fracture can be any of a brittle fracture, a ductile fracture, a slip fracture, a creep rupture failure, buckling failure, any other failure type, or combinations thereof. In some embodiments, the thermal trigger 230 can deform at the predetermined temperature, causing an intermediary feature, mechanism, or device to cause the bus bar 220 to fracture. In some embodiments, the thermal trigger 230 can deform at the predetermined temperature, causing the movable portion 226 of the bus bar 220 to be moved translationally or rectilinearly away from the terminal 221. In some embodiments, deformation of the thermal trigger 230 at the predetermined temperature can initiate a chemical and/or thermal event that results in the disconnection of the electrical circuit between the electrochemical cell and a charging source or a discharge load.

In some embodiments, the thermal trigger 230 can have a first configuration below a predetermined temperature or predetermined temperature range, and a second configuration at or above the predetermined temperature or predetermined temperature range. In some embodiments, the first configuration is a bent configuration, and the second configuration is an extended configuration. In some embodiments, the thermal trigger 230 can be superelastic at temperatures below the predetermined temperature and revert back to a straight annealed shape at or above the predetermined temperature. In some embodiments, the shape memory characteristic of the thermal trigger 230 leads to irreversible deformation. In other words, in some embodiments, the thermal trigger 230 can move from the first configuration to the second configuration at the predetermined temperature, however if the temperature subsequently drops below the predetermined temperature the thermal trigger 230 may remain in the second configuration. In some embodiments, the thermal trigger 230 has reversible shape memory, meaning the thermal trigger 230 may only remain in the second configuration while the temperature of the thermal trigger remains at or above the predetermined temperature. In some embodiments, the actuation of the thermal trigger 230 leading to the opening of the electrical circuit occurs after an electrochemical cell has already been irreversibly damaged. In some embodiments, the actuation of the thermal trigger 230 occurs at a low enough temperature such that electrochemical cell is not irreversibly damaged.

In some embodiments, deformation of the thermal trigger 230 causes the movable portion 226 of the bus bar 220 to move about an axis in a hinge-like fashion. In some embodiments, the axis is a hinge 224 in the bus bar 220. In some embodiments, the hinge 224 can be positioned approximately parallel to the engineered fracture site 226. In some embodiments, the distance of travel of the movable portion 226 of the bus bar 220 from the fixed portion 228 of the bus bar 220 is determined at least in part by the distance of travel of the thermal trigger 230. In some embodiments, the distance of travel of the movable portion 226 of the bus bar 220 can also be determined in part due to the distance between the hinge 224 and the engineered fracture site 222.

In some embodiments, the thermal trigger 230 can be positioned between the housing 210 and the bus bar 220 such that the extent and direction of travel of the thermal trigger 230 due to thermal deformation of the thermal trigger 230 is controlled by the position of the thermal trigger 230 relative to the housing 210 and the bus bar 220. In some embodiments, the thermal trigger 230 can be coupled to the housing 210. In some embodiments, the thermal trigger 230 can be coupled to the bus bar 220. In some embodiments, the thermal trigger 230 can be coupled to the housing 210 and the bus bar 220. In some embodiments, the housing 210 and/or the bus bar 220 can include a cavity 218 into which the thermal trigger 230 can be at least partially disposed. In some embodiments, the cavity 218 is dimensioned and configured such that the thermal trigger 230 is fully disposed in the cavity 218 when the thermal trigger 230 is in the first configuration. In some embodiments, when the thermal trigger 230 moves from the first configuration to the second configuration, a portion of the thermal trigger 230 remains disposed in the cavity 218 while a portion of the thermal trigger 230 moves to displace the movable portion 226 of the bus bar 220. In some embodiments, the thermal trigger 230 is adhered to the housing 210 and/or the bus bar 220 using a chemical bonding agent, a thermal fusing process, a high frictional coefficient caused by low engineering tolerance between the size of the cavity 218 and the size of the thermal trigger 230, and any other suitable process or combination thereof. In some embodiments, the housing 210 can include a notch (not shown) that corresponds to the hinge 224 of the bus bar 220 such that the notch and the hinge 224 together provide an axis about which the movable portion 226 of the bus bar 220 rotates after fracture of the bus bar 220.

In some embodiments, the CID 200 is operably coupled to the electrochemical cell such that the CID 200 can be activated to discontinue discharge or charging of the electrochemical cell in response to over-temperature conditions. In some embodiments, the actuation of the thermal trigger 230 leading to the opening of the electrical circuit may occur after an electrochemical cell to which the CID 200 is operably coupled has already been irreversibly damaged. In some embodiments, the actuation of the thermal trigger 230 occurs at a low enough temperature such that an electrochemical cell to which the CID 200 is operably coupled is not irreversibly damaged. In other words, in some embodiments, activation of the CID 200 may reduce the risk of irreversible damage to the electrochemical cell. In some embodiments, the CID 100 can be resettable or replaceable. In some embodiments, if the CID 200 is activated and electrochemical cell is protected from irreversible damage or catastrophic failure (e.g., thermal runaway), the CID 200 or a component thereof can be replaced and the electrochemical cell can be returned to operation. In some embodiments, the whole CID 200 can be replaced to return the electrochemical cell to operation. In some embodiments, the bus bar 220 can be replaced to return the CID 200 to its original pre-activation condition and to return to the electrochemical cell to operation. In some embodiments, the bus bar 220 and the thermal trigger 230 can be replaced to return the CID 200 to its original pre-activation condition and to return the electrochemical cell to operation.

To provide an overall understanding, certain illustrative embodiments have been described; however, it will be understood by one of ordinary skill in the art that the systems, apparatuses, and methods described herein can be adapted and modified to provide systems, apparatuses, and methods for other suitable applications and that other additions and modifications can be made without departing from the scope of the systems, apparatuses, and methods described herein.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

As used herein, the term "about" and "approximately" generally mean plus or minus 10% of the value stated, for example about 250 μm would include 225 μm to 275 μm, approximately 1,000 μm would include 900 μm to 1,100 μm.

Conventional terms in the fields of endoscopic devices have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The invention claimed is:

1. An apparatus, comprising:
   a housing;
   an electrochemical cell disposed in the housing;
   a bus bar coupled to the housing and a terminal of the electrochemical cell, the bus bar including a thinned portion; and
   a thermal trigger dimensioned and configured to deform at a predetermined temperature from a bent configuration to a straight configuration,
   wherein a current flow through the bus bar above a threshold increases the temperature of the bus bar at the thinned portion of the bus bar causing deformation of the thermal trigger, the deformation of the thermal trigger from the bent configuration to the straight configuration operable to cause the bus bar to break at an engineered fracture site.

2. The apparatus of claim 1, wherein the bus bar includes a fixed portion coupled to the housing, and a movable portion configured to be moved from a first position to a second position by deformation of the thermal trigger.

3. The apparatus of claim 2, wherein the bus bar includes a hinge disposed between the fixed portion and the movable portion, the hinge defining an axis of rotation about which the movable portion travels from the first position to the second position.

4. The apparatus of claim 1, wherein the thermal trigger includes at least one of a shape memory alloy and a bi-metallic material.

5. The apparatus of claim 4, wherein the thermal trigger includes a nitinol-containing material.

6. The apparatus of claim 1, wherein the thinned portion includes the engineered fracture site.

7. The apparatus of claim 1, wherein the thermal trigger includes a plurality of thermal triggers positioned along the engineered fracture site.

8. The apparatus of claim 1, wherein the engineered fracture site is curved.

9. The apparatus of claim 1, wherein the engineered fracture site includes at least one of a groove, etched line, furrow, rut, trench, indentation, or a hollow section.

10. An apparatus, comprising:
a housing;
an electrochemical cell disposed in the housing;
a bus bar coupled to the housing and a terminal of the electrochemical cell, the bus bar including a thinned portion; and
a thermal trigger having a first end disposed in the housing in a first configuration and a second configuration, the thermal trigger having a second end disposed proximate to the bus bar in the first configuration, the second end of the thermal trigger movable relative to the first end such that the second end deforms at a predetermined temperature from the first configuration to the second configuration,
wherein a current flow through the bus bar above a threshold increases the temperature of the bus bar at the thinned portion of the bus bar causing deformation of the thermal trigger, the deformation of the thermal trigger from the first configuration to the second configuration operable to cause the bus bar to break at an engineered fracture site.

11. The apparatus of claim 10, wherein the bus bar includes a fixed portion coupled to the housing, and a movable portion configured to be moved from a first position to a second position by deformation of the thermal trigger.

12. The apparatus of claim 11, wherein the bus bar includes a hinge disposed between the fixed portion and the movable portion, the hinge defining an axis of rotation about which the movable portion travels from the first position to the second position.

13. The apparatus of claim 10, wherein the thermal trigger includes at least one of a shape memory alloy and a bi-metallic material.

14. The apparatus of claim 13, wherein the thermal trigger includes a nitinol-containing material.

15. The apparatus of claim 10, wherein the first configuration is a bent configuration.

16. The apparatus of claim 15, wherein the second configuration is a straight configuration.

17. The apparatus of claim 10, wherein the thinned portion includes the engineered fracture site.

18. The apparatus of claim 10, wherein the thermal trigger includes a plurality of thermal triggers positioned along the engineered fracture site.

19. The apparatus of claim 10, wherein the engineered fracture site is curved.

20. The apparatus of claim 10, wherein the engineered fracture site includes at least one of a groove, etched line, furrow, rut, trench, indentation, or a hollow section.

* * * * *